United States Patent
Fieger

(10) Patent No.: US 9,975,396 B2
(45) Date of Patent: May 22, 2018

(54) INSTALLATION FRAME FOR HEAT EXCHANGER

(71) Applicant: MAHLE International GmbH, Stuttgart (DE)

(72) Inventor: Martin Fieger, Tamm (DE)

(73) Assignee: MAHLE International GmbH, Stuttgart (DE)

( * ) Notice: Subject to any disclaimer, the term of this patent is extended or adjusted under 35 U.S.C. 154(b) by 343 days.

(21) Appl. No.: 14/547,776

(22) Filed: Nov. 19, 2014

(65) Prior Publication Data

US 2015/0144757 A1 May 28, 2015

Related U.S. Application Data

(63) Continuation of application No. PCT/EP2013/060459, filed on May 22, 2013.

(30) Foreign Application Priority Data

May 22, 2012 (DE) .................. 10 2012 208 588

(51) Int. Cl.
| | |
|---|---|
| *F28D 1/00* | (2006.01) |
| *F28F 7/00* | (2006.01) |
| *B60H 1/00* | (2006.01) |
| *F28F 9/00* | (2006.01) |
| *F28F 21/06* | (2006.01) |
| *F28D 21/00* | (2006.01) |

(52) U.S. Cl.
CPC ..... *B60H 1/00585* (2013.01); *B60H 1/00321* (2013.01); *B60H 1/00521* (2013.01); *F28F 9/001* (2013.01); *B60H 2001/00635* (2013.01); *F28D 2021/008* (2013.01); *F28F 21/06* (2013.01); *F28F 2009/004* (2013.01); *F28F 2225/02* (2013.01); *F28F 2255/02* (2013.01); *F28F 2265/30* (2013.01)

(58) Field of Classification Search
CPC ........ F28F 2280/06; F28F 9/001; F28F 9/002; F28F 9/005; F28F 2009/004; F28F 2230/00; B60H 2001/00635; B60H 1/00585; B60H 1/00321; B60H 1/00521
USPC .................................................... 165/149, 81
See application file for complete search history.

(56) References Cited

U.S. PATENT DOCUMENTS

| | | | | |
|---|---|---|---|---|
| 5,094,290 A | * | 3/1992 | Buckreus | F16J 3/042 165/81 |
| 5,632,328 A | * | 5/1997 | Sawyer | B60H 1/00321 165/67 |

(Continued)

FOREIGN PATENT DOCUMENTS

| | | |
|---|---|---|
| DE | 27 50 236 C2 | 8/1987 |
| DE | 196 54 776 A1 | 7/1998 |

(Continued)

*Primary Examiner* — Jason Thompson
(74) *Attorney, Agent, or Firm* — Muncy, Geissler, Olds & Lowe, P.C.

(57) ABSTRACT

An installation frame for a heat exchanger, in particular for a heat exchanger in particular for installation in an air-conditioning system for motor vehicles, having frame elements that encompass the heat exchanger at the short sides thereof arranged parallel to the air flow direction, whereby the frame elements are connected to one another, and whereby the installation frame is in the form of a sealing element.

4 Claims, 4 Drawing Sheets

(56) References Cited

U.S. PATENT DOCUMENTS

| | | | | |
|---|---|---|---|---|
| 5,660,228 A * | 8/1997 | Steege | ............... | F24F 12/006 |
| | | | | 165/145 |
| 6,298,908 B1 * | 10/2001 | Harrell | ............... | B60H 1/00521 |
| | | | | 165/69 |
| 2002/0112906 A1 * | 8/2002 | Guyomard | ............... | F28F 9/002 |
| | | | | 180/68.4 |
| 2003/0051497 A1 * | 3/2003 | Nomura | ............... | B60H 1/00521 |
| | | | | 62/239 |
| 2008/0017362 A1 * | 1/2008 | Kwon | ............... | F24F 12/006 |
| | | | | 165/166 |
| 2009/0120610 A1 * | 5/2009 | Coyle | ............... | B60H 1/00321 |
| | | | | 165/67 |

FOREIGN PATENT DOCUMENTS

| | | |
|---|---|---|
| DE | 199 18 167 A1 | 10/2000 |
| EP | 0 863 030 A2 | 9/1998 |
| EP | 2 058 156 A1 | 5/2009 |
| GB | 1 595 598 | 8/1981 |

* cited by examiner

INSTALLATION FRAME FOR HEAT EXCHANGER

This nonprovisional application is a continuation of International Application No. PCT/EP2013/060459, which was filed on May 22, 2013, and which claims priority to German Patent Application No. DE 10 2012 208 588.2, which was filed in Germany on May 22, 2012, and which are both herein incorporated by reference.

BACKGROUND OF THE INVENTION

Field of the Invention

The invention relates to an installation frame for a heat exchanger, particularly for a heat exchanger for installation in an air conditioning system for motor vehicles, having frame elements that surround the heat exchanger on the short sides thereof arranged parallel to the air flow direction.

Description of the Background Art

Heat exchangers for air conditioning systems for use in motor vehicles are installed in air conditioning units, particularly in air flow channels of the air conditioning units. In order to achieve the highest degree possible of flow around the heat exchanger with the medium flowing in the air flow channel, it is necessary to install the heat exchanger sealed as well as possible relative to the housing of the air conditioning unit, so that no air gaps form between the heat exchanger and air conditioning unit, as a result of which so-called leaking air can flow past the heat exchanger.

It is furthermore necessary to decouple the heat exchanger from the rest of the air conditioning unit in order to keep it clear of harmful effects due to vibrations.

This is achieved today either by foam strips glued circumferentially laterally to the heat exchanger, which in the installed state run between the heat exchanger and the housing of the air conditioning unit.

Alternatively, side parts are used, which are clipped laterally to the corrugated fins of the heat exchanger, which then secure the positioning of the heat exchanger.

It is particularly disadvantageous in the prior art that the foam strips tend to absorb water, which can promote the growth of bacteria that perhaps can lead to an unpleasant odor for the vehicle passengers. Moreover, the aging characteristics of many foams are not optimal, so that hardening can occur as a result of which the decoupling is negatively affected. The additional clipped-on side parts are relatively expensive and must be readapted to each heat exchanger.

SUMMARY OF THE INVENTION

It is therefore an object of the present invention to provide an installation frame, which enables a simple installation and good sealing positioning with simultaneously good decoupling behavior. In addition, the installation frame is to be adaptable simply and cost-effectively to different heat exchangers and air conditioning units.

An installation frame for a heat exchanger is advantageous, particularly for a heat exchanger for installation particularly in an air conditioning system for motor vehicles, having frame elements that surround the heat exchanger on the short sides thereof arranged parallel to the air flow direction, whereby the frame elements are connected to one another, whereby the frame is formed as a sealing element.

Such an installation frame can be used to install the heat exchanger advantageously in a housing, for example, of an air conditioning system. The installation frame, moreover, can achieve further a sealing effect, which seals the heat exchanger against the housing of the air conditioning system and thus minimizes the amount of leaking air, which can flow past the heat exchanger laterally.

It is advantageous, furthermore, if in each case two frame elements, arranged opposite to one another, are substantially identical.

This allows for the frame elements to be easily adapted to different dimensions of the heat exchanger.

It is also expedient if the frame elements are formed elastic. An advantageous sealing effect can be achieved by elastic frame elements, and in addition a decoupling of the heat exchanger can be achieved.

It is advantageous, moreover, in that the frame elements have elastic hollow profiles.

A greater sealing effect is achieved by elastic hollow profiles, because the frame elements can also be installed under pretension, which can produce additional advantages with respect to the fixation of the heat exchanger in the housing of the air conditioning system.

It is also expedient, if the installation frame has frame elements made of thermoplastics and/or elastomers and/or metals.

Additional advantages with respect to the fixation, decoupling, or the sealing effect can be achieved by a material selection matched to the intended use.

Furthermore, the frame elements can be connected to one another by a mechanical and/or chemical and/or thermal method.

An advantageous selection of the connecting method can be advantageous with respect to the arising process costs for the joining of the installation frame. In addition, the processing costs and the possibility of a potential disassembly can be favorably influenced by a suitable method.

It is also advantageous if the frame has eight frame elements, whereby four corner elements connect the four opposing frame elements together.

The frame length and frame height can be adapted especially advantageously and simply by such a division of the frame elements, because in this case only the four opposing frame elements must be adapted in their length.

An arrangement of an installation frame for a heat exchanger in an air conditioning system is advantageous, furthermore, whereby the housing of the air conditioning system has on its interior surface grooves in which the installation frame can be inserted.

By an arrangement of grooves on the interior surface, the installation frame with the heat exchanger can be positioned very easily and in addition the sealing effect is advantageously increased by the grooves.

In addition, an arrangement of an installation frame for a heat exchanger in an air conditioning system is expedient, whereby the installation frame seals the heat exchanger against the housing. The amount of leaking air can be reduced considerably in this way.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
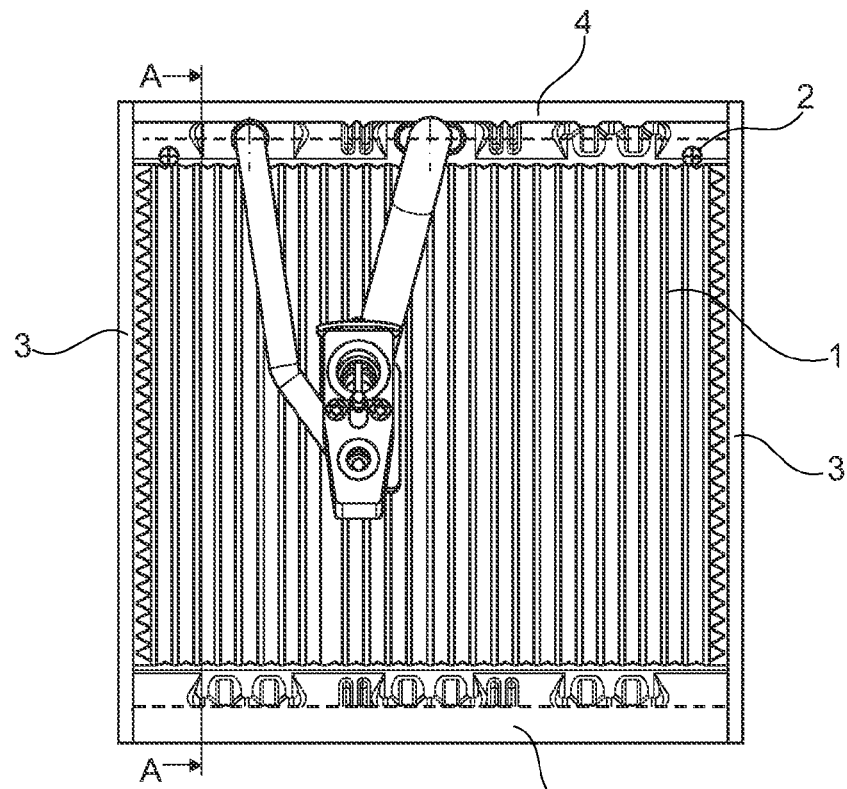
FIG. 1 shows a heat exchanger with a connected expansion valve in a frontal view in an installation frame.

FIG. 1 shows a frontal view of a heat exchanger 1. Heat exchanger 1 is a conventional heat exchanger with two collecting tanks 2, which are connected to one another by a number of tubes. Corrugated fins, which are intended to support the heat exchanger, run between the tubes. The corrugated fins are not shown as continuous for reasons of clarity. The further structure of heat exchanger 1 is not discussed in greater detail at this point, because this is not essential to the invention in the present context.

Heat exchanger 1 is surrounded by a frame 12 along the short side surfaces of heat exchanger 1, which are arranged parallel to the air flow direction of heat exchanger 1. Installation frame 12 shown in FIG. 1 has four individual frame elements. Frame elements 4 are arranged on the top and bottom side of heat exchanger 1, along side tanks 2. Frame elements 3 are arranged on the side to the left and right on heat exchanger 1. Installation frame 12 surrounding the entire heat exchanger is formed overall by the connection of side frame elements 3 to top and bottom elements 4.

Figure 2:
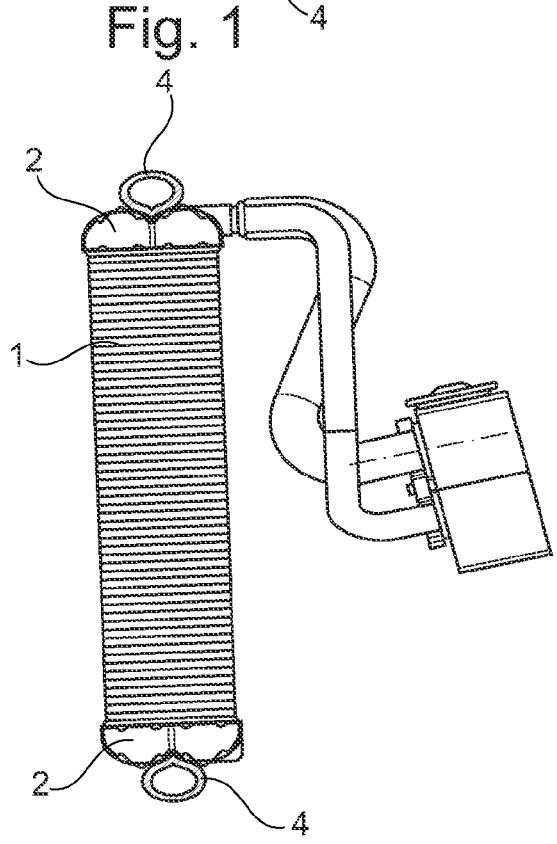
FIG. 2 shows a section through a heat exchanger with an installation frame.

In FIG. 1, the cutting plane A-A is indicated, which defines the view for the following FIG. 2.

FIG. 2 shows, as described, the section along cutting plane A-A indicated in FIG. 1. Heat exchanger 1 in particular can be seen with its top and bottom collecting tanks 2. Furthermore, the top and bottom frame elements 4 are visible. It is also clear from FIG. 2 that the top and bottom frame elements 4 represent a hollow body profile.

Frame elements 4 are placed in the middle on collecting tank 2 of heat exchanger 1.

The form shown here of the hollow body profile of frame elements 4 is only exemplary; any other form is also conceivable in this context. Expediently, the form should make it possible to be able to press together frame elements 4 by an externally applied force. As a result, the entire heat exchanger 1 with its installation frame 12, if it is to be installed in a housing of an air conditioning system, can be installed under a certain pretension. This leads to a more secure seating of heat exchanger 1 within an air conditioning system housing. In addition, the frame elements, which are arranged under pretension between heat exchanger 1 and the air conditioning system housing, take over a sealing action.

Apart from the hollow body profiles shown in FIG. 2 for frame elements 4, a soft solid body profile would also be conceivable, for example, which, like the shown hollow body profiles, is deformable by an externally applied force, similar to the hollow body profiles shown here.

The supply and discharge lines, which are shown in FIGS. 1 to 7 and are connected to a collecting tank 2 of heat exchanger 1, and the expansion valve, which is connected to the supply or discharge lines, are not essential to the invention in this context and are therefore also not described hereinafter.

Figure 3:
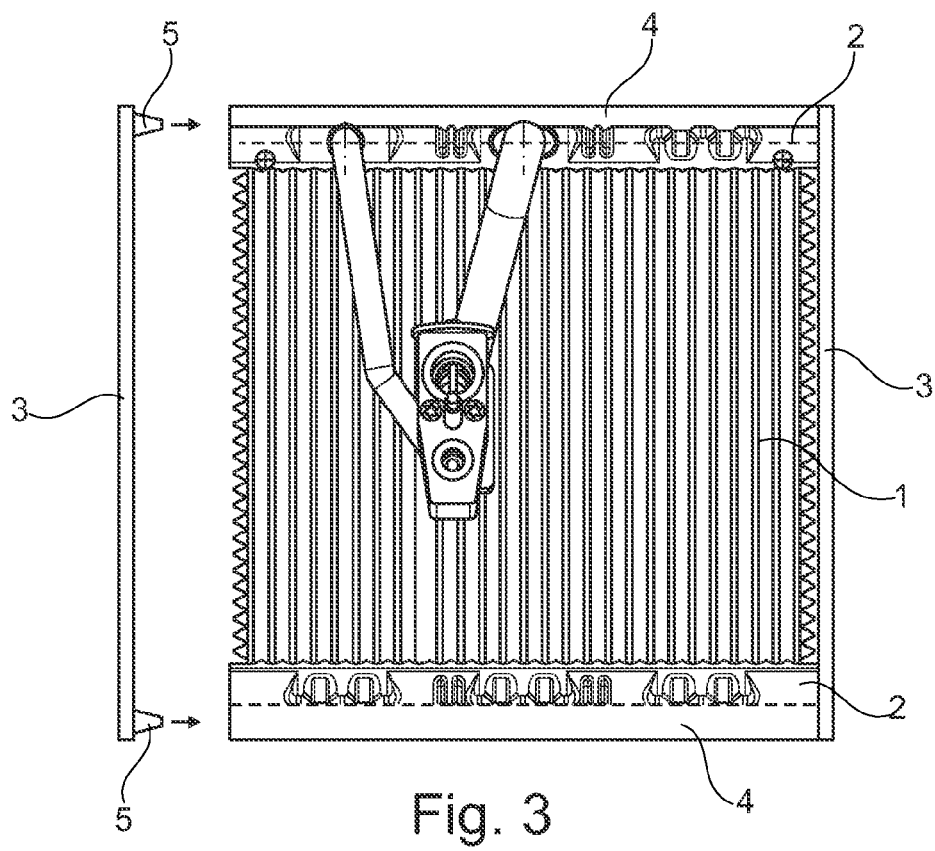
FIG. 3 shows a heat exchanger with a connected expansion valve in a frontal view with a partially assembled installation frame.

FIG. 3 shows an illustration of heat exchanger 1, similar to FIG. 1. In contrast to FIG. 1, left frame element 3 is now shown in a non-installed position.

It can be seen that frame element 3 has a connecting element 5 each at the top and bottom. By said connecting element 5, frame element 3 can be connected to the two top or bottom frame elements 4, which have already been attached to the heat exchanger. The four individual frame elements 3, 4 thus make up a complete installation frame 12.

The connection, shown here via the projecting connecting elements 5 to one of frame elements 3, shows only a first example for possible connecting techniques between the frame elements. Moreover, many other connecting techniques for producing the entire installation frame 12 are conceivable.

In alternative embodiments, for instance, frame elements 3, 4 could be connected together by a thermal method or a chemical method or some other mechanical method. A combination of the just mentioned methods is likewise conceivable.

Figure 4:
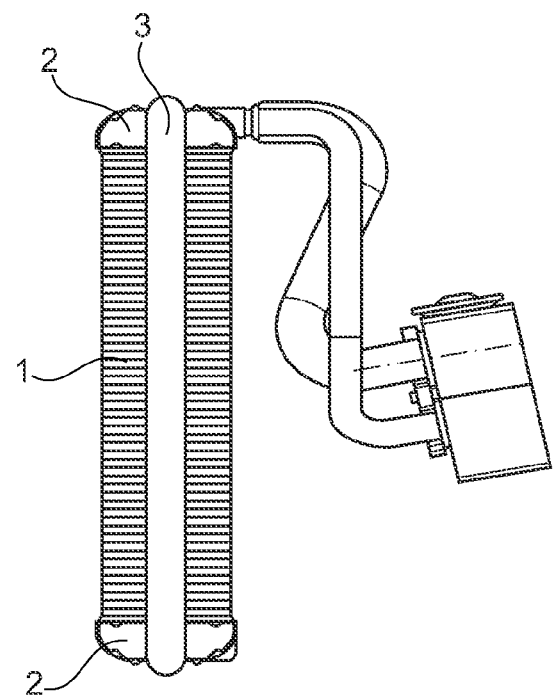
FIG. 4 shows a side view of the heat exchanger with an installation frame.

FIG. 4 shows a side view of heat exchanger 1 already shown in FIGS. 1 to 3. Frame element 3 is illustrated here, which is attached laterally to heat exchanger 1 and is oriented centrally toward one of the short sides that are arranged parallel to the air flow direction.

Figure 5:
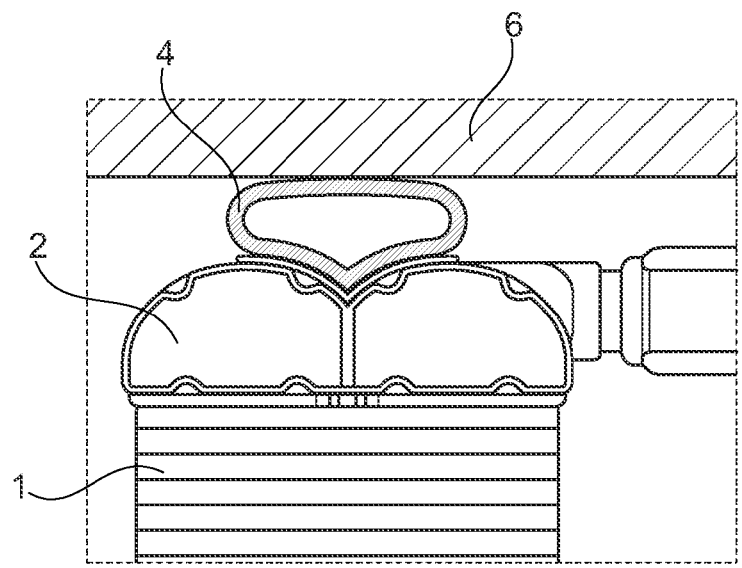
FIG. 5 shows a detailed view of the heat exchanger, mounted in an air conditioning system housing, with an installation frame.

FIG. 5 shows a detailed view particularly of the area of collecting tank 2 of heat exchanger 1 with frame element 4 attached thereto. The situation of installed heat exchanger 1 in a housing 6 of an air conditioning system is shown in FIG. 5. It is evident that frame element 4 in comparison with the cross section shown in FIG. 2 is considerably deformed here in the mounting position.

This deformation of frame element 4 creates pretensions between heat exchanger 1 and housing 6 of the air conditioning system. A better seating of heat exchanger 1 within the housing is assured by the pretension forces acting on both sides of heat exchanger 1, as a result of the deformation of frame elements 4. In addition, frame element 4 takes over the function of the lateral sealing of the heat exchanger within housing 6.

Figure 6:
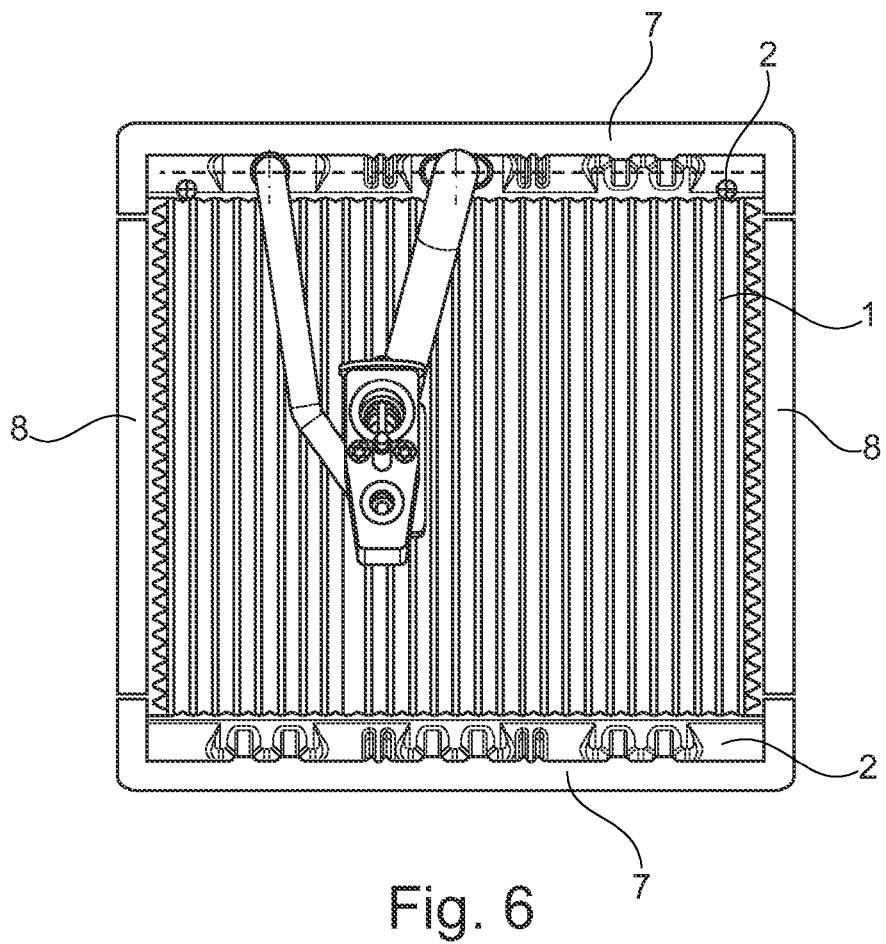
FIG. 6 shows a frontal view of a heat exchanger with a connected expansion valve with an alternative embodiment of the installation frame.

FIG. 6, like the analogue in FIGS. 1 and 3, shows a frontal view of heat exchanger 1. As a departure from installation frame 12 in FIGS. 1 to 5, installation frame 12 here now includes two frame elements 7 and of two frame elements 8. Frame elements 7, which are arranged above and below on collecting tank 2, now have a U-shaped profile, which surrounds collecting tanks 2 also laterally on the right and left. Installation frame 12 is thereby completed by the laterally attached frame elements 8 that run to the left and right of heat exchanger 1.

Similar to the already described installation frame 12 in the other figures, frame elements 7, 8 are connected together by the already mentioned methods here as well.

Both frame elements 7 and frame elements 8 now have a shape similar to frame elements 4 in FIGS. 1 to 5. Accordingly, both frame elements 7 and frame elements 8 are deformable by an external force. This increases the sealing effect by installation frame 12 and fixes heat exchanger 1 even better in its mounting position within a housing 6 of an air conditioning system.

Figure 7:
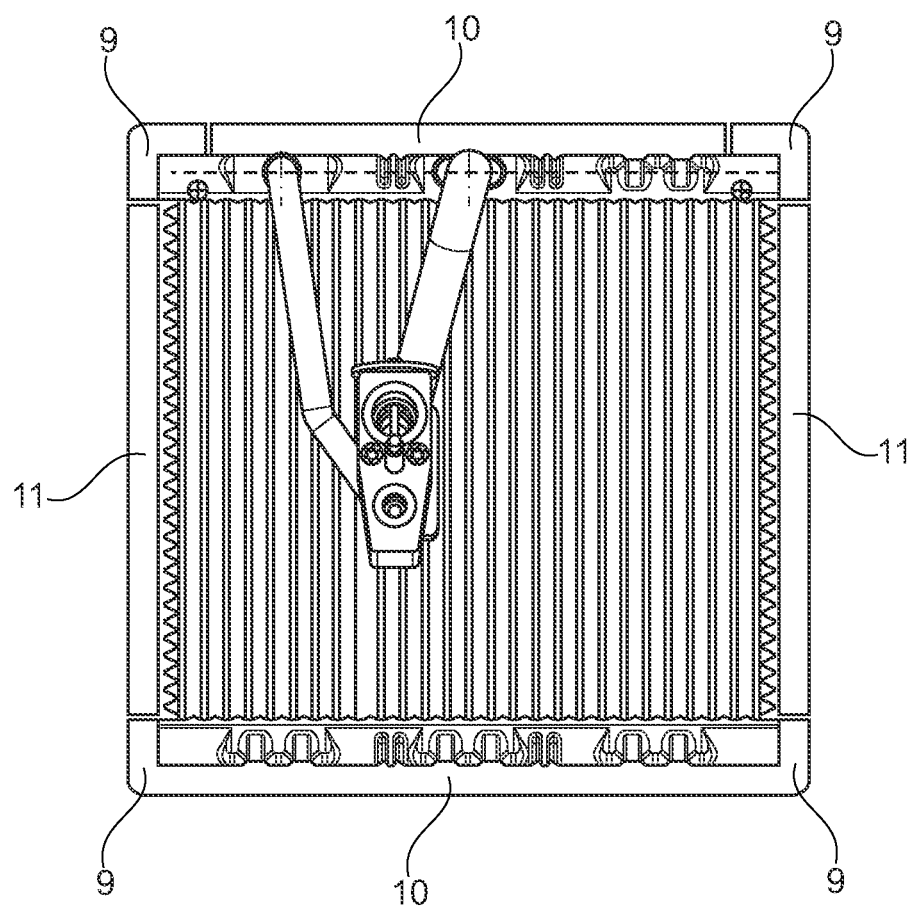
FIG. 7 shows a further frontal view of a heat exchanger with a connected expansion valve with an alternative embodiment of the installation frame.

FIG. 7, like the analogue of FIG. 6, shows a further alternative embodiment of installation frame 12. Installation frame 12 now has a total of 8 parts. Of these, four pieces are corner parts 9. Two of corner parts 9 each are arranged at the top corners and two at the bottom corners. Side parts 10 are arranged at the top and bottom, and side parts 11 on the sides.

Frame elements 9, 10, 11 are again made analogous to the description in FIGS. 1 to 6. Frame elements 9, 10, 11 of FIG. 7 are also deformable by an externally applied force.

Because frame elements 3, 4, 7, 8, 9, 10, 11 are to be usable for as many different heat exchangers and different dimensions as possible, it is advantageous to be able to undertake the simplest possible adaptation of the frame parts to the dimensional variation of the different heat exchangers. A possibility in this respect is to vary only the lengths of the top or side frame elements, in each case with retention of the other geometry. The option whether all frame elements are elastically deformable or only parts, as for example in FIGS. 1 to 5, depends on the intended application and on the predetermined installation situation.

By the selection of rigid connecting elements, as, for instance, connecting elements 3 in FIGS. 1 to 5, heat exchanger 1 can be positioned precisely within a housing 6 of an air conditioning system. This can occur, for instance, by grooves which run laterally in the interior housing wall and in which frame elements 3 can be inserted with an accurate fit.

Elastically deformable elements 4, 7, 8, 9, 10, 11 in addition can increase the decoupling of heat exchanger 1 from vibrations acting on air conditioning system housing 6, and thus contribute positively to the lifetime of heat exchanger 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An installation frame for a heat exchanger for installation in an air conditioning system of a motor vehicle, the installation frame comprising:
   a plurality of frame elements that surround the heat exchanger on two opposing first sides and two opposing second sides thereof arranged parallel to an air flow direction, the plurality of frame elements being connected to one another,
   wherein the installation frame is formed as a sealing element,
   wherein the plurality of frame elements includes at least two pairs of frame elements, frame elements of a first pair of the plurality of frame elements being arranged opposite to one another and being identical and frame elements of a second pair of the plurality of frame elements includes being arranged opposite to one another and being identical,
   wherein the frame elements of the first pair each have an elastic hollow profile and the frame elements of the second pair are each a rigid, planar element,
   wherein the frame elements of the second pair each include a connecting element that protrudes from a surface thereof and that is inserted into the elastic hollow profile of at least one of the frame elements of the first pair,
   wherein the heat exchanger includes a collecting tank at each of the opposing first sides of the heat exchanger, such that the heat exchanger includes two collecting tanks,
   wherein a first frame element of the frame elements of the first pair is positioned to extend along an outer surface of one of the two collecting tanks and a second frame element of the frame elements of the first pair is positioned to extend along an outer surface of a second one of the two collecting tanks, and
   wherein the frame elements of the second pair extend along each of the opposing second sides of the heat exchanger, respectively, the two opposing second sides being oriented perpendicular to the two opposing first sides.

2. The installation frame according to claim 1, wherein the plurality of frame elements are made of thermoplastics and/or elastomers and/or metals.

3. An arrangement of an installation frame for a heat exchanger in an air conditioning system, according to claim 1, wherein a housing of the air conditioning system has on its interior surface grooves in which the installation frame is inserted.

4. The arrangement according to claim 3, wherein the installation frame seals the heat exchanger against the housing.

* * * * *